US010521394B2

(12) United States Patent
Pais et al.

(10) Patent No.: US 10,521,394 B2
(45) Date of Patent: Dec. 31, 2019

(54) APPARATUS AND METHOD FOR IMPROVING APPLICATION PERFORMANCE WITHIN A GROUP OF COMMUNICATION DEVICES

(71) Applicant: MOTOROLA MOBILITY LLC, Chicago, IL (US)

(72) Inventors: Martin R. Pais, North Barrington, IL (US); Morris Bowers, Grayslake, IL (US); Phillip A. Green, Grayslake, IL (US); Gary J. Cunningham, Western Springs, IL (US)

(73) Assignee: Motorola Mobility LLC, Chicago, IL (US)

( * ) Notice: Subject to any disclaimer, the term of this patent is extended or adjusted under 35 U.S.C. 154(b) by 430 days.

(21) Appl. No.: 14/800,722

(22) Filed: Jul. 16, 2015

(65) Prior Publication Data

US 2017/0017608 A1 Jan. 19, 2017

(51) Int. Cl.
*G06F 15/173* (2006.01)
*H04W 52/02* (2009.01)

(52) U.S. Cl.
CPC .......... *G06F 15/173* (2013.01); *H04W 52/02* (2013.01)

(58) Field of Classification Search
CPC ..... H04L 67/10; H04L 67/04; H04L 67/1002; G06F 11/30; G06F 11/3419; G06F 15/173; G06F 9/5044; G06F 9/5094; G06F 9/505; H04W 52/02; H04W 52/0209; Y02B 60/50; Y02B 60/165; Y02B 60/12; Y02D 70/26; Y02D 70/142; Y02D 70/22; Y02D 70/00; Y02D 70/144; Y02D 70/162

USPC ........................................................ 709/214
See application file for complete search history.

(56) References Cited

U.S. PATENT DOCUMENTS

| 6,553,228 | B1 | 4/2003 | Kotzin |
| 7,024,196 | B1 | 4/2006 | Kotzin |
| 8,805,764 | B1* | 8/2014 | Rhines ..................... G06N 5/02 706/46 |
| 9,980,232 | B2* | 5/2018 | Semersky ......... H04W 52/0277 |
| 2003/0110423 | A1* | 6/2003 | Helms ..................... G06F 1/206 714/100 |

(Continued)

OTHER PUBLICATIONS

Wi-Fi Alliance Technical Task Group, Wi-Fi Neighbor Awareness Networking (NAN), Wi-Fi NAN Technical Specification Contribution, Version 0.0 (TG Baseline r16), May 29, 2014, all pages.

(Continued)

*Primary Examiner* — Tan Doan
(74) *Attorney, Agent, or Firm* — Yudell Isidore PLLC

(57) ABSTRACT

A method and apparatus are for providing information to at least one other wireless communication device (WCD of a group of WCDs of which the WCD is a member, wherein the WCDs in the group have agreed to share computing resources. An assignment as one of a provider WCD and a recipient WCD is received in response to the information. At least one of two actions is taken. The first action is to operate, as a provider WCD, a power intensive portion of an application and providing the results to at least one recipient WCD of the group of WCDs. The second action is to operate, as a recipient WCD, to receive the results. Another method provides for a WCD to make a selection of the provider and recipient WCDs.

19 Claims, 11 Drawing Sheets

(56) References Cited

U.S. PATENT DOCUMENTS

| | | | | |
|---|---|---|---|---|
| 2003/0236890 A1* | 12/2003 | Hurwitz | ............... | H04L 29/06 709/227 |
| 2008/0162697 A1* | 7/2008 | Griffin | ............... | G06F 9/5044 709/226 |
| 2010/0115096 A1* | 5/2010 | Eruchimovitch | ..... | H04W 52/02 709/226 |
| 2011/0231860 A1* | 9/2011 | Kazama | ............... | G06F 9/5094 718/105 |
| 2012/0176976 A1* | 7/2012 | Wells | ............... | H04W 52/0219 370/329 |
| 2015/0186160 A1* | 7/2015 | Arora | ............... | G06F 12/0864 713/1 |
| 2015/0358810 A1* | 12/2015 | Chao | ............... | H04W 4/001 455/418 |
| 2016/0224081 A1* | 8/2016 | Worthington | ............ | G06N 5/02 |

OTHER PUBLICATIONS

Jian Qiao et al.: "Enabling Device-to-Device Communications in Millimeter-Wave 5G Cellular Networks," Millimeter-Wave Communications for 5G, IEEE Communication Magazine, Jan. 2015, all pages.

Moshsen Nader Tehrani, et al.: "Device-to-Device Communication in 5G Cellular Networks: Challenges, Solutions, and Future Directions", 5G Wireless Communications Systems: Prospects and Challenges, IEEE Communications Magazine, May 2014, all pages.

\* cited by examiner

500

505 PROVIDE INFORMATION TO AT LEAST ONE OTHER WCD OF A GROUP OF WCDS OF WHICH THE WCD IS A MEMBER, WHEREIN THE WCDS IN THE GROUP HAVE AGREED TO SHARE COMPUTING RESOURCES

510 RECEIVE ASSIGNMENT AS ONE OF A PROVIDER WCD AND A RECIPIENT WCD IN RESPONSE TO THE INFORMATION

515 OPERATE, AS A PROVIDER WCD, A POWER INTENSIVE PORTION OF AN APPLICATION AND PROVIDING THE RESULTS TO AT LEAST ONE RECIPIENT WCD OF THE GROUP OF WCDS

520 OPERATE, AS A RECIPIENT WCD, TO RECEIVE THE RESULTS

605 — RECEIVE AT LEAST ONE METRIC FROM AT LEAST TWO WCDS OF A GROUP OF WCDS WHOSE WCDS HAVE AGREED TO SHARE COMPUTING RESOURCES, WHEREIN THE LEAST ONE METRIC COMPRISES AT LEAST ONE TEMPERATURE MEASUREMENT OF EACH OF THE AT LEAST TWO WCDS

610 — DETERMINE THAT A SECOND WCD OF THE AT LEAST TWO WCDS IS RUNNING A POWER INTENSIVE PORTION OF AN APPLICATION THAT CAN ALSO BE RUN BY AT LEAST ONE OTHER OF THE AT LEAST TWO WCDS

615 — SELECT A THIRD WCD OF THE AT LEAST ONE OTHER WCDS TO BECOME A PROVIDER WCD THAT WILL RUN THE POWER INTENSIVE PORTION OF THE APPLICATION AND PROVIDE RESULTS TO AT LEAST ONE RECIPIENT WCD OF THE GROUP OF WCDS, WHEREIN THE SELECTION IS BASED ON THE METRICS

620 — NOTIFY THE SECOND WCD THAT THE SECOND WCD IS SELECTED AS THE PROVIDER WCD

625 — NOTIFY AT LEAST ONE OF THE WCDS IN THE GROUP OF WCDS THAT THE AT LEAST ONE OF THE WCDS IS A RECIPIENT WCD.

705
CALCULATE A CUTBACK DURATION FOR WHICH EACH OF THE GROUP OF WCDS WOULD BE ABLE TO RUN THE POWER INTENSIVE PORTION OF THE APPLICATION AT A MAXIMUM PERFORMANCE LEVEL WITHOUT CROSSING A LIMIT OF ONE OR MORE METRICS

710
SELECT THE WCD WITH THE LONGEST PREDICTED DURATION AS THE PROVIDER

805
DETERMINE THAT PERFORMANCE OF THE APPLICATION IS LIKELY TO BE OPTIMIZED WITHIN THE GROUP BY SELECTING THE PROVIDER WCD TO TAKE OVER RUNNING OF THE POWER INTENSIVE PORTION OF THE APPICATION FROM THE FIRST WCD

FIG. 8

APPARATUS AND METHOD FOR IMPROVING APPLICATION PERFORMANCE WITHIN A GROUP OF COMMUNICATION DEVICES

FIELD OF THE INVENTION

The present invention relates generally to communication devices, and more specifically to improving application performance within a group of communication devices performing a common power intensive application.

BACKGROUND

A communication device may be running a power intensive application that causes the communication unit to self-impose limits that may affect the functionality of the communication device. This is particularly true for portable and personal communication devices, but could occur in other mobile communication devices and perhaps some fixed communication devices, such as sensor or monitoring devices. For example, the processor of a communication device may overheat while executing a power intensive application and as a consequence may lower its processor's speed of processing, either to protect the processor or nearby components, e.g., the battery, from damage, or a user from uncomfortable case temperatures. This may cause disturbing effects, such as pausing and skipping of video results, or even shutdown of the power intensive application.

Some wireless communication devices have a capability of communicating in more than one manner, such as by one or more wide area communication networks, by Wi-Fi® RF protocol, and/or by Bluetooth® RF protocol. Some of these wireless communication devices are capable of automatically selecting from among the available manners of communication to reduce their resource usage, such as using a Wi-Fi communication link when one is available, which may reduce power consumption and/or circuit operating temperatures.

Wireless communication devices are sometimes organized into groups for a variety of purposes. For example, a group may be formed of communication devices that are participating in a cellular phone system provider's family plan or communication devices that are used by employees in a business.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

FIG. 5 is a flow chart that shows some steps of a method used in a wireless communication device, in accordance with certain embodiments.

FIG. 6 is a flow chart that shows some steps of a method used in a wireless communication device, in accordance with certain embodiments.

FIG. 7 is a flow chart that shows some steps used to select the third wireless communication device, which is described with reference to FIG. 6, in accordance with certain embodiments.

FIG. 8 is a flow chart that shows a step used to select the third wireless communication device, which is described with reference to FIG. 6, in accordance with certain embodiments.

Figure 1:
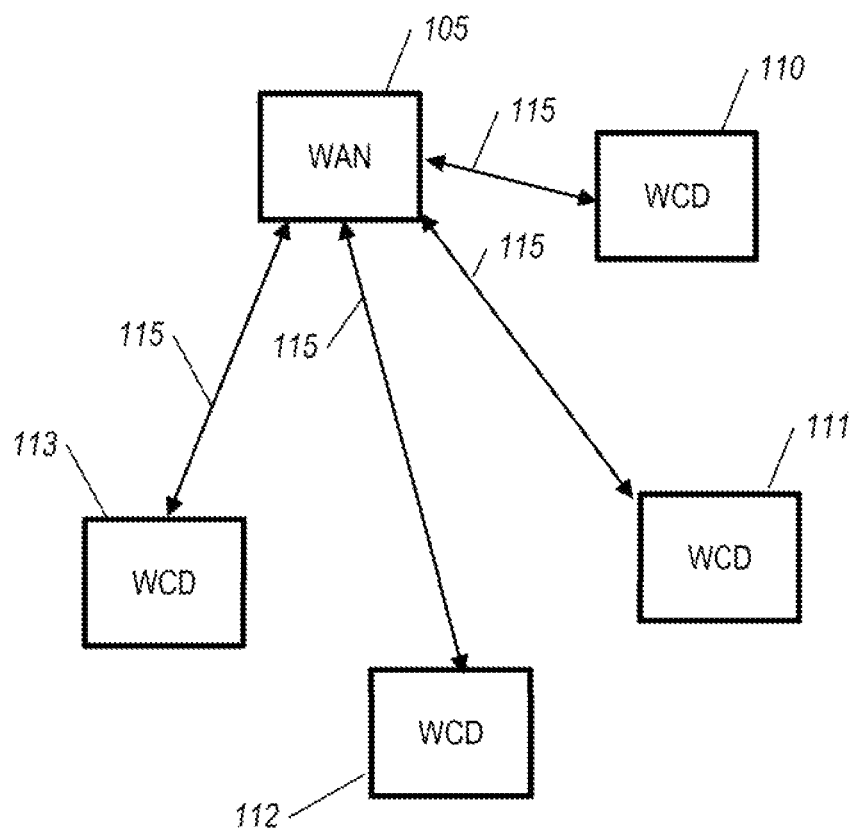
FIG. 1 is a system block diagram that shows a portion of a wide area communication system, in accordance with certain prior art embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to improving application performance in a group of wireless communication devices (WCDs) by sharing resources among the WCDs. Generally speaking, a WCD in the group is selected and assigned to execute a power intensive portion of an application and interact with the other WCDs in the group to provide them results of executing the power intensive portion of the application.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "including," "having", or any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a", "includes . . . a, or "having . . . a" does not, without more constraints, preclude the existence of additional identical elements in the process, method, article, or apparatus that comprises, includes, or has the element. The term "coupled" as used herein is defined in the sense that information or energy is passed from one electrical device to another, not necessarily directly, and not necessarily without delay or temporary storage.

Referring to FIG. 1, a system block diagram 100 shows a portion of a wide area communication system, in accordance with certain prior art embodiments. The wide area communication system comprises a wide area network (WAN) 105, and some wireless communication devices (WCDs) 110-113 that comprise a portion of the active WCDs that are operating in the wide area communication system over communication links 115. The wide area communication system is a cellular system. The WAN 105 comprises many fixed network components, such as base stations and backhaul devices, as well as central processing and routing devices, as are well known in the art. The WCDs 110-113 in this prior art example are communication devices that are being operated by a group of users who are participating in a game. In this example, WCD 110 is a mobile WCD. The game involves the active movement of many objects in a three dimensional (3D) game space, and requires power intensive processing to update the 3D game space and to determine the needed 2D views (slices) for presentation on the displays of the WCDs 110-113.

Figure 2:
FIG. 2 is a graph that shows plots related to the performance of two cores of a processor operating in a wireless communication device in the prior art example of FIG. 1.

Referring to FIG. 2, a graph shows plots related to the performance of two cores of a processor operating in the WCD 110 in the prior art example of FIG. 1, in which WCD 110 is running steaming video having a power intensive portion. Plot 205 shows the temperature on a printed circuit board under the processor that is handling the power intensive portion of the game application. The processor has two CPUs (two cores). As the game progresses from an idle state at a temperature of about 34 degrees Celsius, the temperature increases. Plots 210, 215 show the frequencies at which the two cores are running. At the idle state, the frequency at which core 1 is running, shown by plot 210, is about 1.95 GHz, and the frequency at which core 2 is running, shown by plot 215, is about 1.55 GHz. After about 12 minutes, the temperature reaches 45 degrees Celsius. At this time, the frequency at which core 1 is running has been reduced to about 1.65 GHz and the frequency at which core 2 is running has been reduced to approximately 0.95 GHz. The user starts experiencing jumpy video and delays. At about 16 minutes, the temperature increases to about 47 degrees Celsius. At this point 220 core 1 is stopped to avoid probable damage. The game performance becomes too poor to use. The user has had warning that WCD 110 cannot handle continuous participation in the game from the effects that occur at after 11 minutes, but is likely not happy with the fact that his use is limited to 15 minutes.

Alternatively, WCD 110 may run out of battery charge, which would end the user's involvement in the game, or WCD 110 may be communicating from an edge of a cell, which may incur excessive costs for the user. Each of these other aspects are undesirable. The aspect of over-heating the processor can occur in prior art WCDs when other application having power intense portions are run. Two examples are video streaming and navigation.

Figure 3:
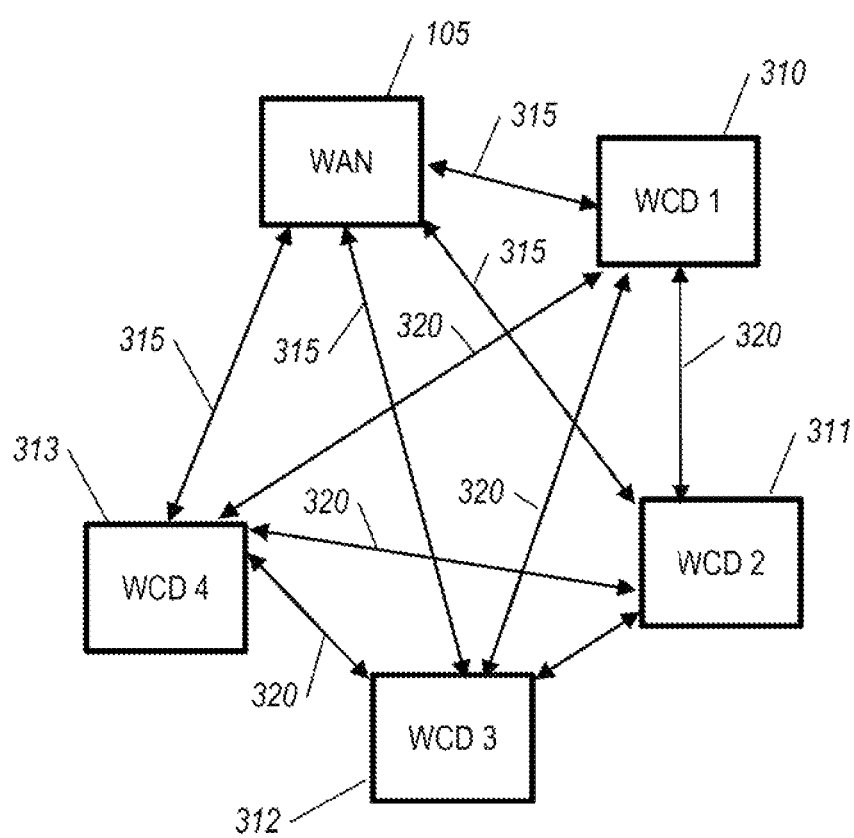
FIG. 3 is a system block diagram that shows a portion of a wide area communication system, in accordance with certain embodiments.

Referring to FIG. 3, a system block diagram 300 shows a portion of a wide area communication system, in accordance with certain embodiments. The wide area communication system comprises the wide area network (WAN) 105 described with reference to FIG. 1, and some wireless communication devices (WCDs) 310-313 that comprise a portion of the active WCDs that may be operating in the wide area communication system. The wide area communication system may alternatively be, for example, any other cellular system or an enterprise system. The WCDs 310-313 are a group of WCDs that are being operated by a group of users. Each of the WCDs of the group may connect to the wide area network 105 as needed using links 315. Each of the WCDs 310-313 of the group or the user or owner of the WCDs of the group have agreed, or agree during execution of the unique techniques described herein, to share their computing resources by having one member run high power portions of applications that include high power portions. The WCDs 310-313 include unique software that reduces or eliminates the problems described above with reference to WCD 110 (FIG. 1). WCDs 310-313 are mobile WCDs, although they could alternatively be personal, vehicular, mobile or fixed WCDs.

Generally speaking, the unique techniques described in further detail below provide that when one of the WCDs is running into resource limits because the WCD is running a power intensive portion of an application, the running of the power intensive portion of the application is assigned to another WCD in the group of WCDs 310-313, as a provider WCD. The provider WCD runs the power intensive portion of the application and sends results to other members of the group or to a recipient device that is not a WCD in the group of WCDs. Local interconnections 320 may be to determine which WCD is to become a provider WCD and to convey the results produced by the provider WCD to the other (recipient) WCDs. In some embodiments, some members of the group may share (as provider or recipient) over a wide area network. The group of WCDs may be of any quantity of WCDs that meet the criteria stated (agreement to share resources). An obvious criteria is that the sharing WCDs have to have a version of an application that is to be shared that is at least capable of running in a recipient mode, and at least two WCDs of the group of WCDs have to have a version of an application that is to be shared that is at least capable of running in a provider mode.

Example 1 of the embodiments. A group of gamers are playing game that involves the active movement of avatars and many objects in a three dimensional (3D) game space, and requires power intensive processing to update the 3D game space and to determine the needed 2D views (slices) for presentation on the displays of the WCDs 310-313. The group was formed through a game server over one or more cellular systems and the members agreed during the formation to allow computer resource sharing to optimize the game experience among the gamers. The unique techniques allows one WCD to become a provider WCD when the experience of another WCD is predicted to start deteriorating due to resource limitations. The provider WCD runs power intensive portion of the game application and sends the needed 2D slices to the other WCD (a recipient WCD) and may send them to other players as well. The results may be sent to one or all other WCDs using a Wi-Fi® system to which some or all are connected. The loading on the processor of the recipient WCD is lowered and the user of the recipient WCD does not observe performance issues due to temperature problems or battery depletion problems.

Example 2 of the embodiments. A family group is on vacation and at least one family member is using a navigation application on his WCD, which is running a power intensive portion of the navigation application (as well as the rest of the navigation application) that interacts with a wide area network, almost continually receiving and processing directions and nearby object identifications, and his WCD provides a rendering if a map on a display of his WCD. The performance of the navigation system is predicted to deteriorate soon due to resource limitations. The family group has previously agreed, during setup of the family group of WCDs, to share computing resources, or alternatively, a request is sent to the WCDs of the family group of WCDs in response to the determination of the problem, to obtain permission to share computing resources with at least one other WCD of the family group of WCDs, and one more WCDs agree to do so (either by user action at this time or by something setting in the WCD). As in example 1, another WCD of the family group of WCDs is assigned to be a provider WCD and the results are sent at least to the WCD experiencing the predicted performance deterioration, by Bluetooth®.

Example 3 of the embodiments. An office group is making a presentation that includes a video that is being streamed over a wide area wireless network to a WCD of one of the office group for display on large video presentation setup. The performance is predicted to start deteriorating due to resource limitations in the WCD. The office group's users have previously agreed to, or agree to, in response to the prediction, at least one other of the WCDs of the office group to share computing resources. One other of the WCDs of the office group is selected as a provider WCD to take over the processing needed to convert raw streaming video received over the wide area network into decoded streaming video that is communicated to the large video presentation setup. The raw streaming input may continue to be coupled from the wide area wireless network from the original WCD to the provider WCD over a local interconnection (such as Wi-Fi®), or the provider WCD may take over the interconnection to the wide area wireless network. Either approach may allow the original WCD to avoid causing performance problems for the presentation.

Figure 4:
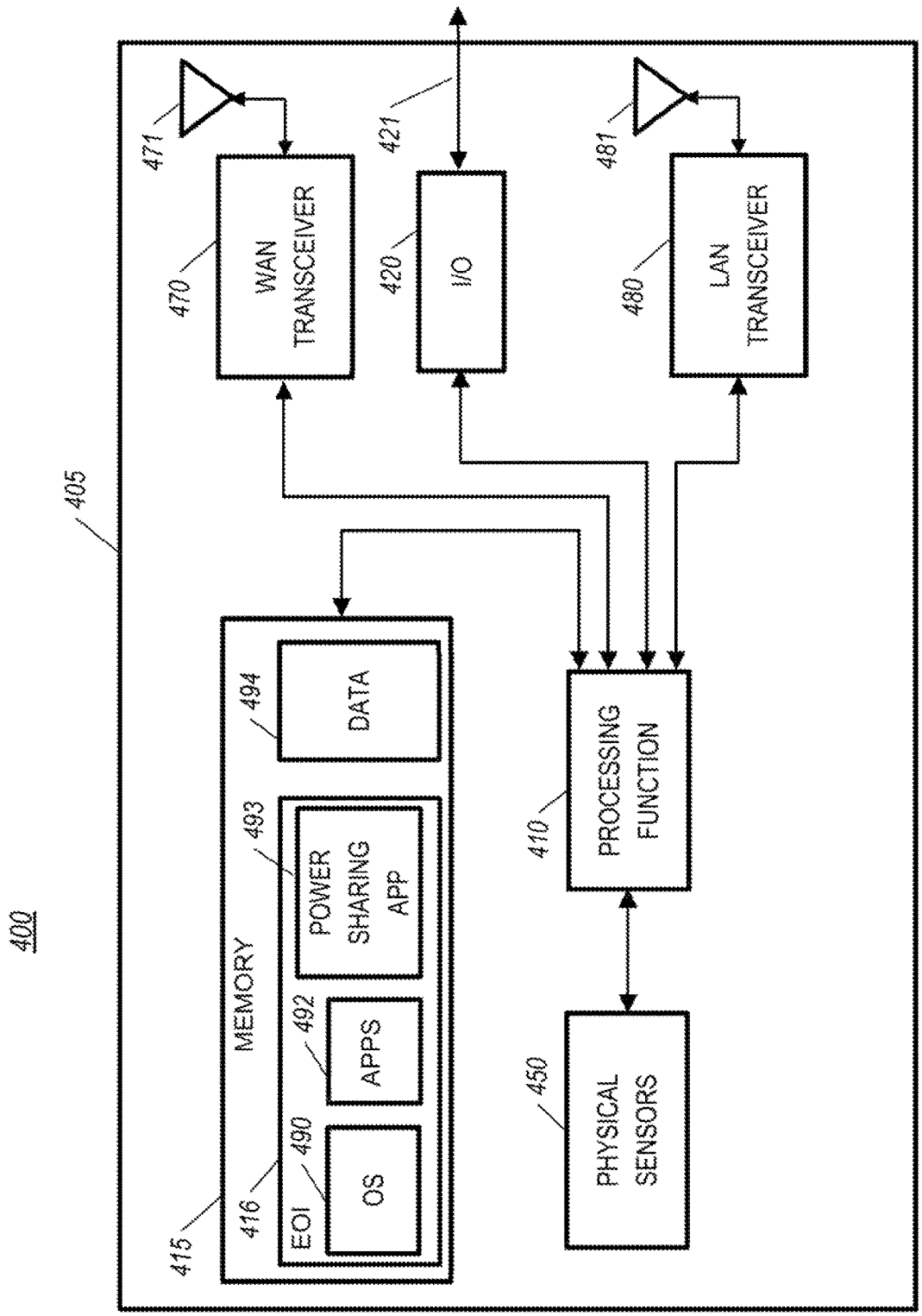
FIG. 4, is a functional block diagram that shows a wireless communication device (WCD), in accordance with certain embodiments.

Referring to FIG. 4 a functional block diagram 400 shows a WCD 405, in accordance with certain embodiments. The WCD 405 includes a processing function 410, a memory 415, input/output interface circuitry 420, and one or more physical sensors 450. The processing function 410 comprises one or more processing devices (not shown in FIG. 4), each of which may include such sub-functions as central processing units (cores), cache memory, instruction decoders, just to name a few. The processing function 410 executes program instructions which may be located within memory in the processing devices or may be located in a memory 415 external to the processing function 410, to which the memory 415 is bi-directionally coupled, or in a combination of both. The processing function 410 may, in some embodiments, be further coupled to a radio wide area network receive-transmit function (also referred to as the radio network transceiver) 470 that is coupled to a radio antenna 471, which may be internal or external to the electronic device 405. A second wide area network transceiver may be included (not shown in FIG. 4). The wide area network transceiver or transceivers may be for cellular, enterprise, public safety, or other wide area systems. The processing function 410 may also be coupled to a local area network transceiver 480 with associated antenna 481. Additional local or personal area network or mesh network transceivers may be included (not shown in FIG. 4). The local, personal, and mesh network transceivers may be for Wi-Fi®, Bluetooth®, Zigbee®, or other local area networks, personal area networks, or local mesh networks. The electronic device 405 has a power source (not shown in FIG. 4) that is a rechargeable battery in some embodiments. In some embodiments one or more of the radio transceivers themselves comprise one or more processors and memory, and may also comprise circuits that are unique to radio protocols defined by an industry standard. Some embodiments may have a Wi-Fi® transceiver but no cellular transceiver, such as some devices commonly referred to as pads or tablets. Other examples of the electronic device 405 include smart watches and fitness monitors The functional block diagram 400 (FIG. 4) shows the executable operating instructions (EOI) 416 being stored in the memory 415, external to the processing function 410, but as noted above, the memory 415 may be within or shared with the one or more processing devices. The memory 415 also stores data 494. The EOI 416 of the electronic device 405 includes groups of instructions identified as an operating system (OS) 490, software applications 492 (including software utilities), and a software application called the power sharing app 493. The applications 492 may include conventional human interface applications such as game applications, navigation application, video processing applications, and sensor processing applications. Some of these applications are modified to run a power intensive portion of the application separately from the remainder of the application. The power sharing app 493 performs many of the functions described below. The combination of the processing function 410, the EOI 416, and the data 494 may also be referred to as the processing system of the electronic device 405. The processing function 410 may include input/output (I/O) interface circuitry and/or may be coupled, as shown in FIG. 4, to separate I/O interface circuitry 420 that is controlled by the processing function 410. The I/O interface circuitry 420 provides for communications between the processing system and some hardware elements of the electronic device, including human interface components, such as keys, displays, and to wired I/O 421 such as that which uses standard hardware and software protocols Universal Serial Bus, 1394, or Ethernet). The processing system is coupled to the physical sensors 450 via the processing function 410. The physical sensors include at least one temperature sensor and a battery state of charge sensor that indicates a remaining charge in the main battery of the WCD. Many WCDs include a plurality of temperature sensors, such as up to 16. The processing function 410 also obtains information from the transceivers that allows the power sharing application to determine a power consumption rate of the transceivers for various combinations of protocols and quality of services that are in use. The processing system thus obtains temperature, state of battery charge and transmitter power consumption metrics, and typically many other metrics.

The power sharing application 493 may use at least some of the metrics of temperatures, battery state of charge, and transmitter power consumption and provides most of the unique functions described below. One or more of the applications 492 that have power intensive portions may be modified in accordance with the embodiments described herein to generate results needed when the WCD 405 is operating as a provider WCD and/or to accept results needed when the WCD is operating as a recipient WCD, in ways known to those of ordinary skill in the art.

Referring to FIG. 5, a flow chart 500 shows some steps of a method for wireless communication device operation, in accordance with certain embodiments. The embodiments generally include a WCD (e.g., WCD 110) performing as one or both of a provider and recipient. At step 505 information is provided by the WCD (WCD 110) to at least one other WCD (e.g., one of WCDs 111-113) of a group of WCDs (e.g., WCDs 110-113) of which the WCD is a member. The WCDs in the group have agreed to share computing resources. The agreement may have occurred as a result, for example, of setting up the group, or may occur as an initial step in the method. At step 510, an assignment is received by the WCD as one of a provider WCD and a recipient WCD in response to the information. The information may be a calculated cutback duration or may be one or more metrics that include at least a temperature metric. The cutback duration is a duration for which the WCD would be able to run a power intensive portion of an application at a maximum performance level without crossing a limit of one or more metrics. The cutback duration is calculated based on at least one temperature metric of the WCD. As a provider WCD, the WCD at step 515 operates a power intensive portion of an application and provides results of that operation to at least one recipient WCD of the group of WCDs. As a recipient WCD, the WCD at step 520 operates as a recipient WCD, to receive the results and send them to a portion (not the power intensive portion) of the application within the recipient WCD for use by the application such that the experience of the user of the recipient is the same as it would have been were the application fully operated within the recipient WCD, except that the performance is most likely to be better for longer. The WCD may operate as only a provider when the user does not need to interact with the application that has the power intensive portion. WCDs other than the one that is a provider may act as recipient WCDs for the application, to allow their users to interact with the application while their processing systems avoid having to run the power intensive portion of the application. A WCD that operates as a provider may also act as a recipient so that the user of the WCD can interact with the application. Some WCDs of the group may be acting as neither provider nor recipient at any particular time, but may be available to become at least a provider. The step of providing information 505 may be performed over a network within which the group of WCDs are interconnected that is one of a wide area network such as a cellular network, a local area network such as Wi-Fi®, a personal area network such as a Bluetooth® network, or a mesh network, such as a Zigbee® network. Cost and/or speed of communication may make the wide area network a less favorable choice. Network availability within the WCDs is a requirement. A combination of networks may be used when needed and available.

Referring to FIG. 6, a flow chart 600 shows steps of a method used in a first wireless communication device, in accordance with certain embodiments. At step 605, one or more metrics are received by the first WCD from at least two WCDs of a group of WCDs whose WCDs have agreed to share computing resources. The one or more metrics comprise at least one temperature measurement of each of the at least two WCDs. A determination is made by the first WCD at step 610 that a second WCD that is one of the at least two WCDs is running a power intensive portion of an application. The power intensive application is one that can also be run by at least one other of the at least two WCDs. At step 615, a third WCD of the at least one other WCDs is selected by the first WCD to become a provider WCD that will run the power intensive portion of the application and provide results to at least one recipient WCD of the group of WCDs. The selection is based on the metrics. The second WCD is notified at step 620 by the first WCD that the second WCD is selected as the provider WCD. At step 625, which is optional, at least one of the WCDs in the group of WCDs is notified by the first WCD that it is a recipient WCD. In some embodiments, such as example 3 of the embodiments described above, the results may go to an electronic device that is not a member of the group and there may be no recipients identified within the group, and therefore step 625 may not be used. The at least one metric may further include one of a battery charge status, a power consumption rate, and a power consumption efficiency. The steps of receiving 605 notifying 620, and the optional step of notifying 625 may be performed over a network within which the group of WCDs are interconnected that is one of a wide area network such as a cellular network, a local area network such as Wi-Fi®, a personal area network such as a Bluetooth® network, or a mesh network, such as a Zigbee® network. Cost and speed of communication may make the wide area network a less favorable choice. Network availability within the WCDs is a requirement. A combination of networks may be used when needed and available. In some embodiments, the first WCD may not be a member of the group of WCDs In some embodiments, the first WCD may be a fixed network of a wide area communication system.

Referring to FIG. 7, a flow chart 700 shows some steps used to perform step 615 described above with reference to FIG. 6, in accordance with certain embodiments. At step 705, a cutback duration is calculated by the first WCD. The cutback duration is the duration for which each of the group of WCDs is calculated to be able to run the power intensive portion of the application at a maximum performance level without crossing a limit of one or more metrics. At step 710, the WCD with the longest cutback duration is selected as the provider. As an example of calculating a cutback duration in one of the at least two WCDs (hereafter referred to the target WCD), a temperature of the processor of the target WCD is used in conjunction with one or more prior recorded temperatures of the processor of the target WCD to determine a processor temperature cutoff duration, at which time the speed of one or more cores of the processor may be reduced, or a core shut down, either of which will degrade the performance of the power intensive portion of the application. In embodiments in which the state of the charge of the battery is received as a metric, the example may be extended to include using the state of charge in conjunction with prior recorded states of charge to predict when the target WCD would cutback or shut off the application due to low battery charge. In embodiments in which a second temperature is reported by the target WCD, that temperature may also be used with prior recordings to determine another temperature cutoff time. For example, a case temperature may be near a case temperature limit due to the running of the application and a high ambient temperature. A case temperature cutoff duration may be determined from the reported case temperature and prior recorded case temperatures. When operation of the power intensive portion of the application in the target WCD involves communicating substantial information to a wide area network (such as may occur in a navigation application), the radio frequency power amplifier power consumption may be high when the target WCD is at a cell edge and may dominate the power consumption of the WCD. This may be used with the battery state of charge to predict the battery cutback rate, which is particularly useful if the history of the battery state of charge is not known or the rate of battery discharge is varying because of the position of the WCD in the wide area network. Power consumption during the running of an application that demands substantial computing resources is also affected by a number of factors that determine the power efficiency of a particular WCD. Included in these are the type of CPU (RISC, General Purpose CPU, Graphics CPU), the speed of the CPU, the amount of cache memory, the RF connection required to provide the needed bandwidth, and the transistor technology. After calculating more than one type of cutback duration for the target WCD, the shortest one may then be chosen as the cutback duration for the target WCD.

Referring to FIG. 8, a flow chart 800 shows a step used to perform step 615 described above with reference to FIG. 6, in accordance with certain embodiments. At step 805, a determination is made by the first WCD that performance of the application is likely to be optimized within the group by selecting an optimal provider WCD to take over running of the power intensive portion of the application from the first WCD. One form of optimization is described with reference to FIG. 7 above, in which the WCD having the longest cutback duration is selected as the optimal provider. Other metrics that may be available may allow other optimization algorithms. For example, a WCD that does not have the longest cutback duration may be selected as the optimal provider WCD if the WCD is in standby or is not being used for any defined critical functions. In another example, a network uplink bandwidth may be used to select among WCDs having longer cutbacks durations, with weighting given to one that can provide enough bandwidth to each supplied WCD so that the user experience is not degraded compared to the WCDs operating independently. Instead of calculating the cutback time for each WCD using a maximum performance level, an acceptable performance level may be used when the cutback durations for the WCDs are getting short, to avoid rapid reselections of the WCDs as provider WCDs and to extend the operational time of the application. Weightings may be used for each type of cutback durations within a WCD when the WCD cutback duration is being determined for each WCD.

Figure 9:
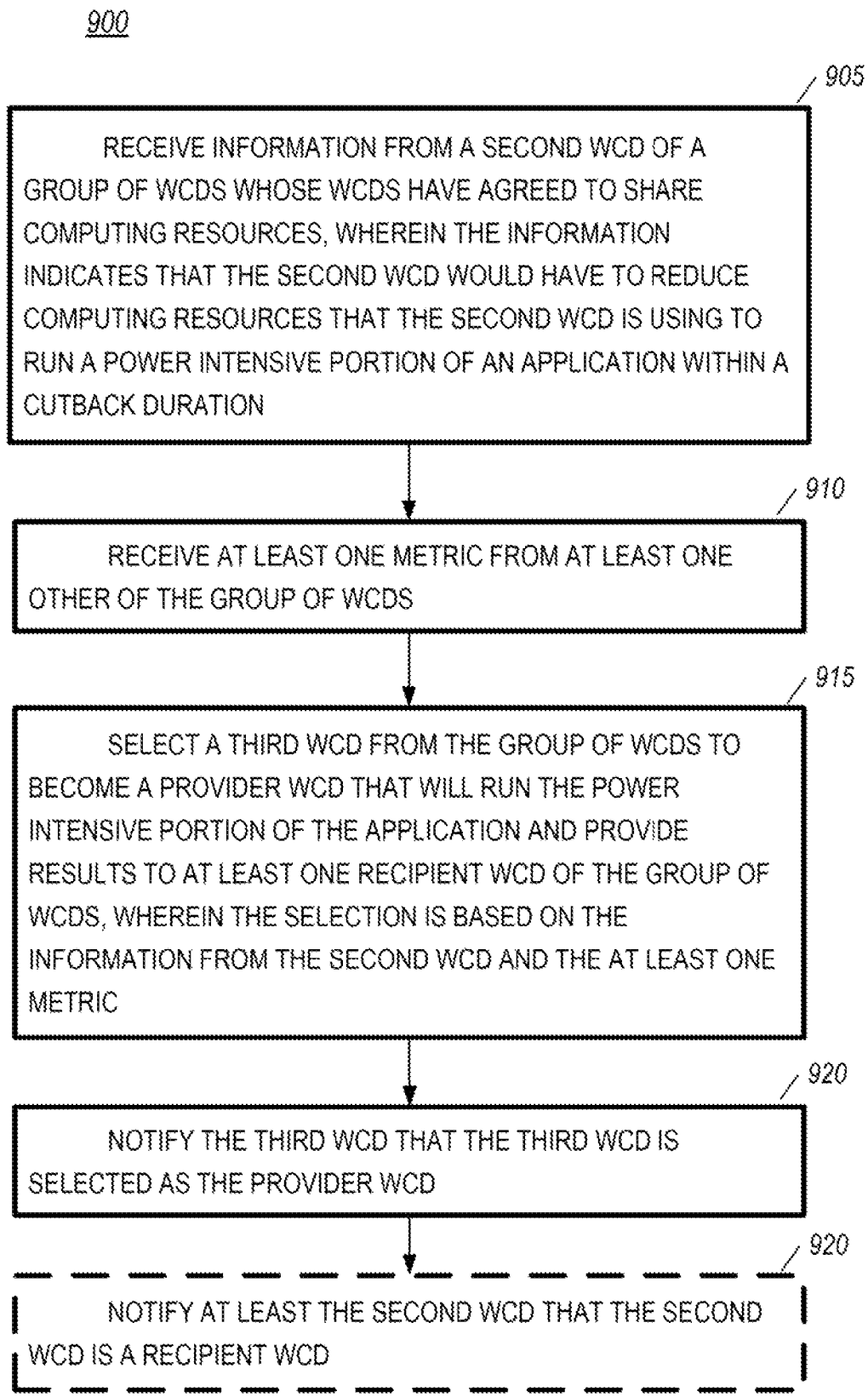
FIG. 9 is a flow chart that shows some steps of a method used in a first wireless communication device, in accordance with certain embodiments.

Referring to FIG. 9, a flow chart 900 shows some steps 905 of a method used in a first wireless communication device, in accordance with certain embodiments. At step 905 information is received by the first WCD from a second WCD of a group of WCDs whose WCDs have agreed to share computing resources. The information indicates that the second WCD would have to reduce the computational resources that are used by the first WCD to run a power intensive portion of an application, within a cutback duration. At least one metric is received by the first WCD at step 910 from at least one other of the group of WCDs. The at least one metric includes at least one of a temperature, a battery charge status, a power consumption rate, and a power consumption efficiency. At step 915, a third WCD from the group of WCDs is selected by the first WCD to become a provider WCD that will run the power intensive portion of the application and provide results to at least one recipient WCD of the group of WCDs. The selection is based on the information from the second WCD and the at least one metric. At step 920, the first WCD notifies the third WCD that the third WCD is selected as the provider WCD. At step 925, which is optional, at least the second WCD is notified by the first WCD that it is a recipient WCD. In some embodiments, such as example 3 of the embodiments described above, the results may go to an electronic device that is not a member of the group and there may be no recipients identified within the group, and therefore step 925 may not be used. The steps of receiving 905, notifying 920, and the optional step of notifying 925 may be performed over a network within which the group of WCDs are interconnected that is one of a wide area network such as a cellular network, a local area network such as Wi-Fi®, a personal area network such as a Bluetooth® network, or a mesh network, such as a Zigbee® network. Selection may be based on lowest bearer cost and/or speed of communication which may make the wide area network a less favorable choice. Network availability within the WCDs is a requirement. A combination of networks may be used when needed and available. In some embodiments, the first WCD may not be a member of the group of WCDs In some embodiments, the first WCD may be a fixed network of a wide area communication system. It will be appreciated that the first and second WCDs may in some instances be one and the same WCD. The information in this case is generated and received internally by the one and same WCD.

Figure 10:
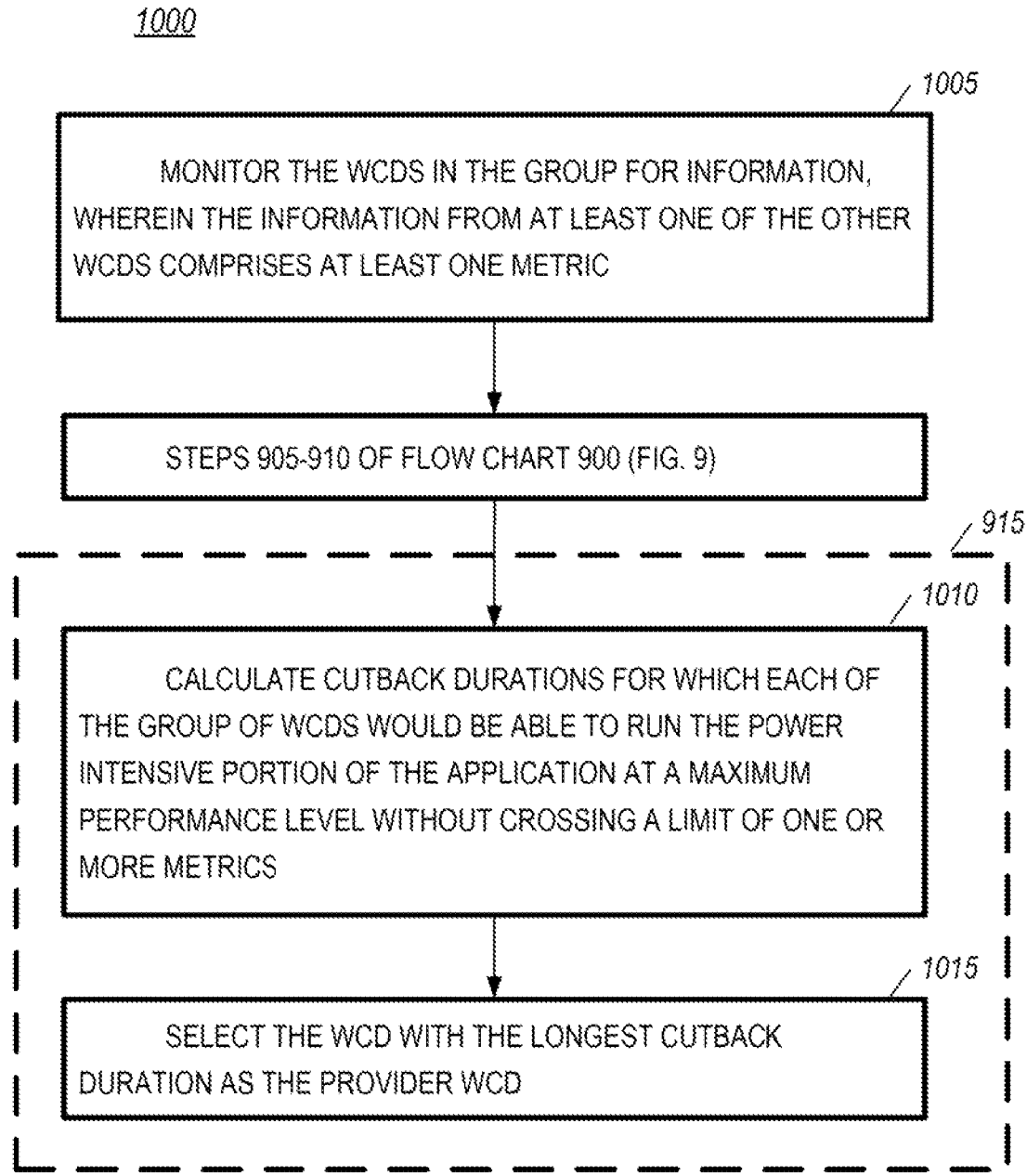
FIG. 10 is a flow chart that shows further steps of the method used in a wireless communication device described with reference to FIG. 9, in accordance with certain embodiments.

Referring to FIG. 10, a flow chart 1000 shows further steps of the method used in a wireless communication device described with reference to FIG. 9, in accordance with certain embodiments. At step 1005, the WCDs in the group are monitored for information. The information from at least one other WCD comprises at least one metric. The monitoring is performed at intervals that are less than a switchover duration. The switchover duration is designed to allow the provider and recipient WCDs to be selected, to be notified, and to establish their configuration as provider and recipients under expected worst case conditions. Worst case conditions may include such parameters as slowest inter-connection communication rates, maximum group size, and getting acceptance of the sharing of computing resources from additional WCDs not in the group (but having some association with the WCDs that are already in the group). Steps 905-910 are performed as described above with reference to FIG. 9. Step 915 (FIG. 9) comprises steps 1010 and 1015. At step 1010, cutback durations are calculated for which each of the group of WCDs would be able to run the power intensive portion of the application at a maximum performance level without crossing a limit of one or more metrics. This step is performed as described with reference to FIG. 7, step 705. The cutback durations are larger than the switchover duration. At step 1015, the WCD with the longest predicted duration is selected as the provider WCD. This step is performed as described with reference to FIG. 7, step 710.

Figure 11:
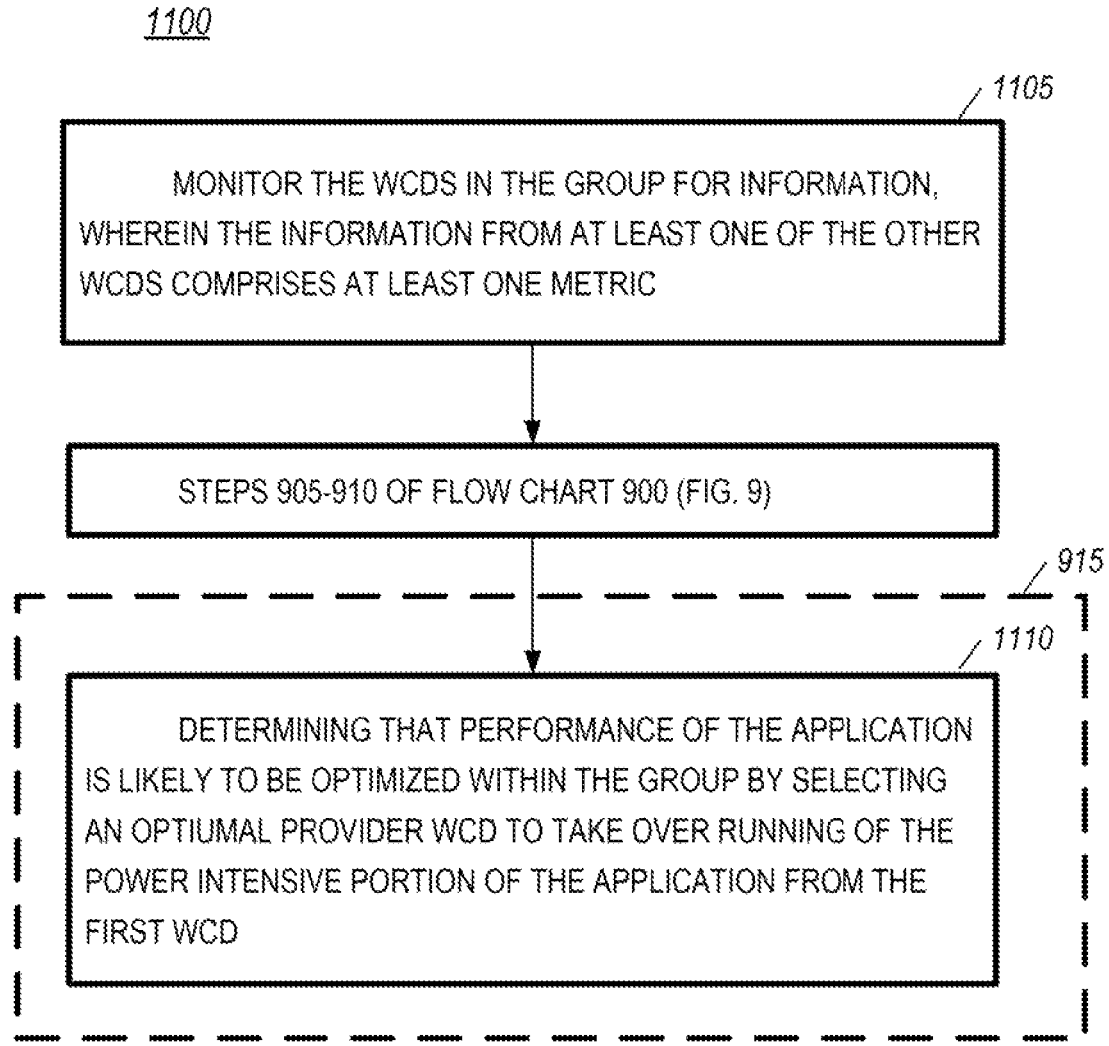
FIG. 11 is a flow chart that shows further steps of the method used in a wireless communication device described with reference to FIG. 9, in accordance with certain embodiments.

Referring to FIG. 11, a flow chart 1100 shows further steps of the method used in a wireless communication device described with reference to FIG. 9, in accordance with certain embodiments. At step 1105, the WCDs in the group are monitored for information. The information from at least one other WCD comprises at least one metric. The monitoring is performed at intervals that are less than a switchover duration. The switchover duration is designed as described above with reference to FIG. 10, step 1005. Steps 905-910 are performed as described above with reference to FIG. 9. Step 915 (FIG. 9) comprises steps 1110 in these embodiments. At step 1110, a determination is made by the first WCD that performance of the application is likely to be optimized within the group of WCDs by selecting an optimal provider WCD to take over running of the power intensive portion of the application from the first WCD. Step 1110 is performed as described with reference to FIG. 8, step 805.

Figure 12:
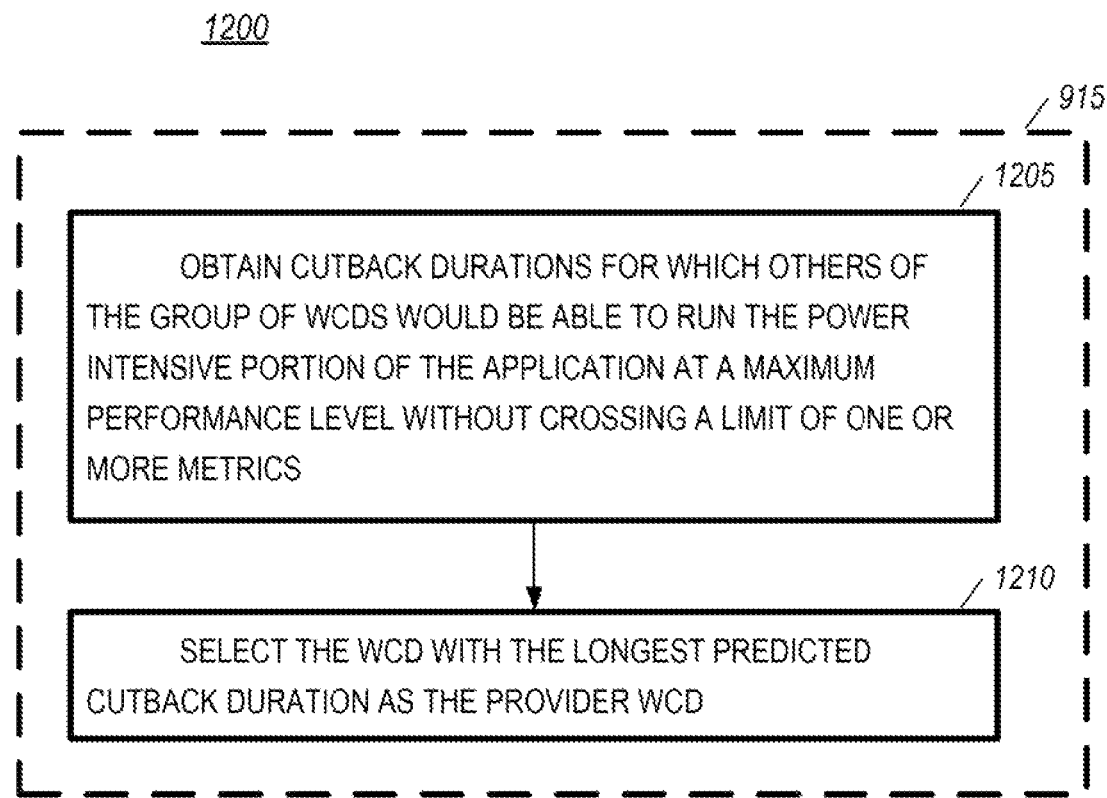
FIG. 12 is a flow chart that shows some steps used to perform a step described above with reference to FIG. 9, in accordance with certain embodiments.

Referring to FIG. 12, a flow chart 1200 shows some steps used to perform step 915 described above with reference to FIG. 9, in accordance with certain embodiments. In these embodiments, the information includes a cutback duration for which the second WCD would be able to run the power intensive portion of the application at a maximum performance level without crossing a limit of one or more metrics. In these embodiments, the information from the second WCD may be obtained spontaneously from the second WCD when the second WCD determines that the cutback interval for the second WCD is approaching a switchover duration, and is greater than or equal to the switchover duration. This method eliminates the need for a WCD (or multiple WCDs) to repetitively monitor the group of WCDs, as described above with reference to FIGS. 10-11. The switchover duration is described above with reference to FIG. 10. At step 1205, cutback durations for which others of the group of WCDs would be able to run the power intensive portion of the application at a maximum performance level without crossing a limit of one or more metrics are obtained. These cutback durations may be obtained by the first WCD in response to receiving the information from the second WCD. The cutback durations of the others in the group of WCDs may be obtained as cutback durations calculated by each of the others in the group of WCDs, or may be obtained from metrics received from each of the others in the group, upon request from the first WCD. At step 1210, the WCD with the longest cutback duration is selected as the provider WCD. In an alternative embodiment, when the first WCD receives the metrics instead of the cutback durations from each of the other WCDs, the first WCD may determine the provider WCD based on optimizing the performance of the application, as described above with reference to FIG. 11, step 1110.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 6-10, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method used in a wireless communication device (WCD), the method comprising:

calculating, by the WCD, a cutback duration for which the WCD is able to run a power intensive portion of an application at a maximum performance level without crossing a limit of one or more metrics, wherein calculating the cutback duration comprises calculating a processor temperature cutoff duration of the WCD, at which time a speed of one or more cores of the processor may be reduced or a core shut down, which degrades a performance of the power intensive portion of the application;

providing, by the WCD, information to a first WCD of a group of WCDs of which the WCD is a member, wherein the WCDs in the group are interconnected over a network and have agreed to share computing resources, and wherein the information comprises the cutback duration and at least one metric including a current temperature of the WCD as a temperature metric;

in response to providing the information, receiving, from the first WCD within the group of WCDs, an assignment of the WCD as one of a provider WCD or a recipient WCD, the assignment based on a determination by the first WCD of which WCD among the group of WCDs has a longest predicted cutback duration; and in response to the assignment indicating the WCD is the provider WCD, operating the WCD as a provider WCD by executing a power intensive portion of an application and communicating, via the network, results from the executing of the power intensive portion of the application to at least one of a recipient WCD of the group of WCDs and an electronic device that is not a member of the group of WCDs.

2. The method of claim 1, further comprising:

in response to the assignment indicating the WCD is the recipient WCD, operating the WCD as a recipient WCD by receiving the results communicated, via the network, from another WCD operating as the provider WCD.

3. A method used in a first wireless communication device (WCD), the method comprising:
  receiving, at the first WCD, at least one metric from each of at least two other WCDs of a group of WCDs whose WCDs have agreed to share computing resources, wherein the at least one metric comprises at least one temperature metric of each of the at least two other WCDs, wherein the group of WCDs are interconnected via a network and the at least one metric is received over the network;
  determining, by the first WCD, that a second WCD that is one of the at least two other WCDs is running a power intensive portion of an application that can also be run by at least one other WCD of the at least two other WCDs;
  calculating, by the first WCD, from the at least one temperature metric received for each of the at least two other WCDs, a cutback duration for each of the at least two other WCDs, the cutback duration being a duration for which each of the at least two other WCDs is able to run a power intensive portion of an application at a maximum performance level without crossing a limit of one or more metrics associated with a respective one of the at least two other WCDs, wherein calculating the cutback duration comprises calculating a processor temperature cutoff duration of a corresponding processor of each respective WCD of the at least two other WCDs, at which time a speed of one or more cores of the processor may be reduced or a core shut down, which degrades a performance of the power intensive portion of the application;
  selecting, by the first WCD, based on at least the received temperature metric of each of the at least two other WCDs and based on a determination by the first WCD of which WCD among the at least two other WCDs has a longest predicted cutback duration, a third WCD of the at least two other WCDs to become a provider WCD that will run the power intensive portion of the application and will provide results to at least one of a recipient WCD of the group of WCDs and an electronic device that is not a member of the group of WCDs;
  notifying the third WCD that the third WCD is selected as the provider WCD for at least the power intensive portion of the application running at the second WCD, the notifying performed by the first WCD communicating with the third WCD over the network; and
  notifying at least one other WCD in the group of WCDs that the at least one other WCD is selected as a receiver WCD, by communicating with the at least one other WCD over the network.

4. The method according to claim 3, wherein the notifying the at least one other WCD further comprises:
  notifying the second WCD that the second WCD is a recipient WCD.

5. The method according to claim 3, wherein the at least one metric further includes one of battery charge status, power consumption rate, and power consumption efficiency.

6. The method according to claim 3, wherein the at least one temperature metric comprises a current temperature of a processor of a respective WCD of the at least two other WCDs, the current temperature being used to determine a processor temperature cutoff duration of the respective WCD.

7. The method according to claim 6, wherein:
  the network within which the group of WCDs are interconnected is a wide area network; and
  when a history of a battery state of charge is not known or a rate of battery discharge is varying because of a position of a target WCD, the calculating of a cutback duration further comprises predicting a cutback rate utilizing a battery state of charge and information that a radio frequency power amplifier power consumption is high and dominates a power consumption of the target WCD when the target WCD is at a cell edge.

8. The method according to claim 3 wherein the step of selecting comprises:
  determining that performance of the application is likely to be optimized within the group by selecting a specific WCD as the provider WCD to take over running of the power intensive portion of the application from the first WCD; and
  selecting the specific WCD as the provider WCD.

9. A method used in a first wireless communication device (WCD), the method comprising:
  receiving, at the first WCD, information from a second WCD from a group of WCDs interconnected via a network and whose WCDs have agreed to share computing resources, wherein the information indicates that the second WCD would have to reduce computing resources that the second WCD is using to run a power intensive portion of an application within a cutback duration;
  receiving at least one metric from each of at least two other WCDs of the group of WCDs, the at least one metric include a temperature metric for the at least two other WCDs, the temperature metric comprising a current temperature of a processor of a respective WCD of the at least two other WCDs;
  calculating, by the first WCD, from the at least one metric received for each of the at least two other WCDs, a cutback duration for each of the at least two other WCDs, the cutback duration being a duration for which each of the at least two other WCDs is able to run a power intensive portion of an application at a maximum performance level without crossing a limit of one or more metrics associated with a respective one of the at least two other WCDs, wherein calculating the cutback duration comprises calculating a processor temperature cutoff duration of each of the at least two other WCDs, at which time a speed of one or more cores of the processor may be reduced or a core shut down, which degrades a performance of the power intensive portion of the application;
  monitoring the WCDs in the group for information that comprises at least one metric, wherein the monitoring is performed at intervals that are less than a switchover duration;
  selecting, by the first WCD, a third WCD from the at least two other WCDs from the group of WCDs to become a provider WCD that will run the power intensive portion of the application and will provide results to at least one recipient WCD of the group of WCDs, wherein the selection is based on a determination bar the first WCD that the third WCD has a longest cutback duration among the group of WCDs; and
  notifying the third WCD that the third WCD is selected as the provider WCD for at least the power intensive portion of the application running at the second WCD, the notifying performed by the first WCD communicating with the third WCD over the network.

10. The method according to claim 9, further comprising:
  notifying at least the second WCD that the second WCD is a recipient WCD.

11. The method according to claim 9, wherein the information from at least one of the other WCDs comprises at least the temperature metric.

12. The method according to claim 11, wherein the switchover duration is designed to allow the provider and recipient WCDs to be selected, to be notified, and to establish their configuration as provider and recipients under expected worst case conditions, and wherein the cutback duration is larger than the switchover duration.

13. The method according to claim 9, further comprising:
monitoring the WCDs in the group, wherein the information from at least one other WCD comprises the at least one metric; and
wherein the step of selecting further comprises:
determining that the performance of the application is likely to be optimized within the group by selecting an optimal provider WCD to take over running of the power intensive portion of the application from the first WCD; and
selecting the optimal provider WCD as the provider WCD.

14. The method according to claim 13, wherein:
the switchover duration is designed to allow the provider and recipient WCDs to be selected, to be notified, and to establish their configuration as provider and recipients under expected worst-case conditions;
the cutback duration is larger than the switchover duration; and
selecting the optimal provider WCD comprises at least one of:
selecting as the optimal provider WCD, a WCD that does not have the longest cutback duration in response to the WCD being in standby or not being used for any defined critical functions;
selecting, as the optimal provider WCD, a WCD having a better network uplink bandwidth from among multiple WCDs having longer cutbacks durations, by weighting the WCD that can provide enough bandwidth to each supplied WCD so that a user experience is not degraded compared to independent operation of the WCDs; and
when cutback durations for the WCDs are getting short, avoiding rapid reselections of the provider WCD and extending an operational time of the application by calculating a cutback time for each WCD using an acceptable performance level in place of a maximum performance level.

15. The method according to claim 9, wherein:
the step of selecting further comprises:
obtaining cutback durations for which other WCDs of the group of WCDs would be able to run the power intensive portion of the application at a maximum performance level without crossing a limit of one or more metrics; and
selecting a WCD with the longest predicted cutback duration as the provider WCD.

16. The method according to claim 15, wherein the calculated cutback duration is greater than or equal to a minimum switchover duration designed to allow the provider and recipient WCDs to be selected, notified, and establish their configuration as provider and recipients under expected worst case conditions.

17. The method according to claim 9, wherein the second WCD is the first WCD and the information is generated and received internally within the first WCD.

18. The method according to claim 9, wherein the results of the selecting are provided by the provider WCD to the recipients over an interconnection that is one of a local area network, a personal area network, or a mesh network.

19. The method according to claim 9, wherein the at least one metric includes for each of the at least two other WCDs, the temperature and at least one of a battery charge status, a power consumption rate, and a power consumption efficiency.

* * * * *